June 10, 1930.   M. E. ROE   1,763,183
VEHICLE
Filed March 6, 1926
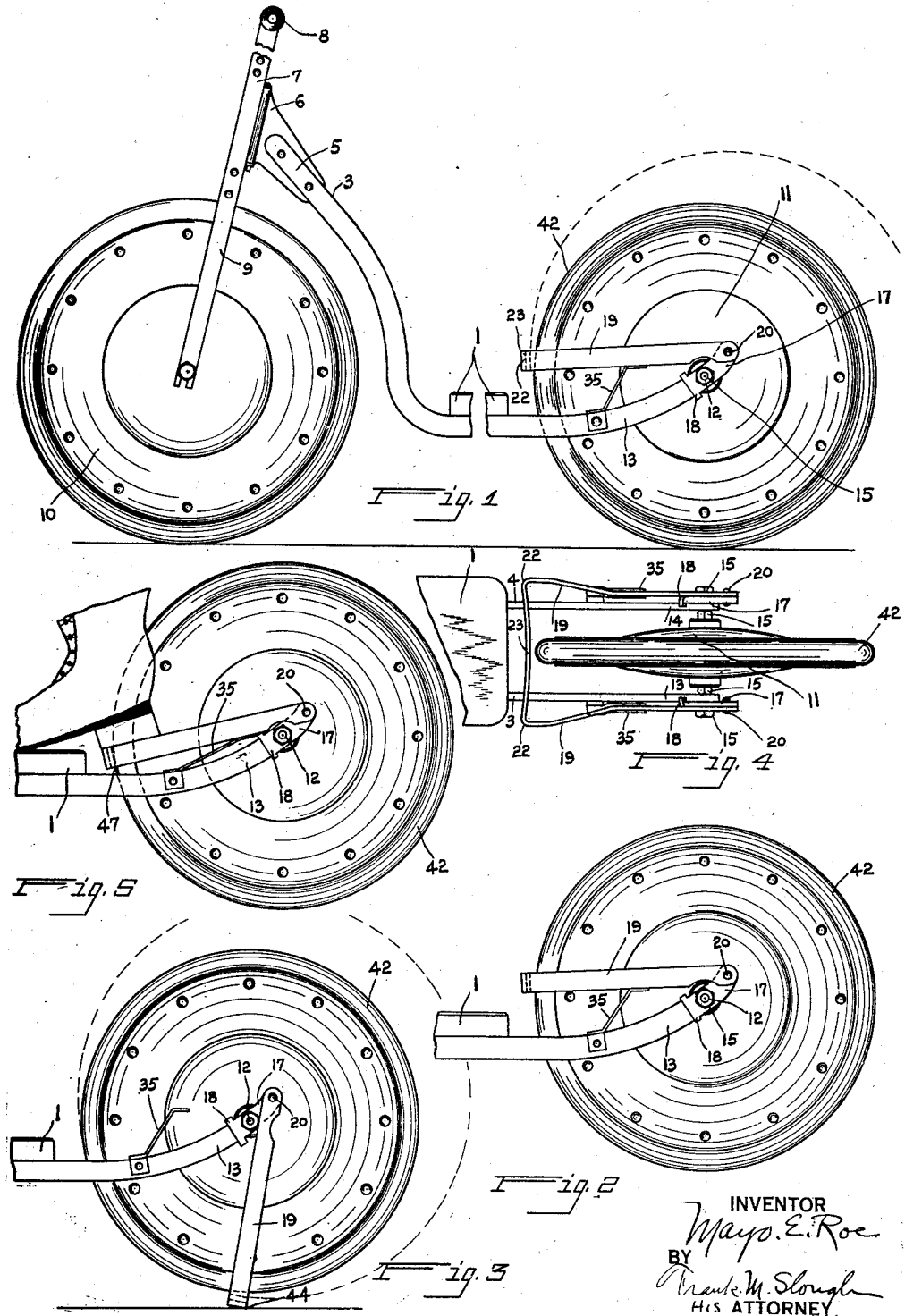
INVENTOR
Mayo. E. Roe
BY
Frank M. Slough
HIS ATTORNEY.

Patented June 10, 1930

1,763,183

UNITED STATES PATENT OFFICE

MAYO E. ROE, OF ELYRIA, OHIO, ASSIGNOR TO THE COLSON COMPANY, OF ELYRIA, OHIO, A CORPORATION OF OHIO

VEHICLE

Application filed March 6, 1926. Serial No. 92,712.

My invention relates to vehicles and relates more particularly to the type of vehicles employing but a single pair of wheels, disposed longitudinally of each other, included in that type of vehicles called "cycles".

An object of my invention is to provide for supporting such a vehicle in an erect position when the vehicle is not in use.

Another object of my invention is to provide for a vehicle capable of standing erect when not in use, improved braking mechanism capable of being actuated by a rider of the vehicle during use thereof.

Another object of my invention is to effect the above desirable functions in mechanism of simple construction, which may be inexpensively manufactured and installed on vehicles of varying types, such as those commonly called "scooters".

Another object of my invention is to provide for the application of composite braking and stand mechanism to a vehicle, which may be applied to vehicles of the ordinary types and which were manufactured without braking mechanism.

These and other objects and the invention itself will be better understood by reference to the following description of an embodiment of my invention, in which description reference will be had to the accompanying drawings forming a part of this specification.

Referring to the drawings:

Fig. 1 shows a vehicle of the scooter type embodying my invention;

Fig. 2 shows a portion of the vehicle illustrating composite braking and stand mechanism, in a view enlarged over that of Fig. 1, in elevation, and with the braking and stand mechanism in inoperative position assumed during use of the vehicle;

Fig. 3 is an elevational view of the apparatus of Fig. 2 but illustrating the mechanism in vehicle supporting position;

Fig. 4 is a plan view of the mechanism; and

Fig. 5 shows the apparatus illustrated in Figs. 2 and 3 but with the mechanism in braking position.

Referring now to all of the figures of drawing, in all of which like parts are designated by like reference characters, at 1, I show a foot board for a two-wheeled vehicle of a well known type carried on frame members 3 and 4 which are joined at 5 to a steering knuckle 6 rotatably secured in a steering column 7 having handles 8 and terminating at its lower end in a fork 9. The fork 9 carries at its lower end a rotatable front wheel 10 which is dirigible by means of the handles 8.

The frame members 3 and 4 extend rearwardly to a rear wheel 11 carried between the ends of the two frame members 3 and 4, the wheel 11 being freely rotatable on an axle 12 secured in the ends 13 and 14 of the frame side members 3 and 4.

As is well known, such a scooter vehicle as so far described is used as a coaster and is propelled at times by the rider resting one foot on the foot board 1 and holding the steering handles 8 and thrusting the other foot rearwardly on the ground to shove the vehicle ahead, the weight of the rider's body being carried on the foot board, and at intervals, when coasting, the rider may rest his entire weight on the foot board.

It is well known that children, who commonly use such vehicles, may desire to use them for coasting down severe grades and into streets where they are endangered by passing traffic, and it is an object of my invention therefore to permit the immediate stopping of the scooter vehicle by the operator through the provision of a highly efficient braking mechanism which may be simply and easily operated to retard the rotation of the rear wheel 11 by bringing into frictional engagement with the tire 42 thereof a brake shoe portion of the mechanism shown at 23. This is accomplished through the medium of a lever comprising a pedal portion and having a retractile spring 35 for restoring purposes, as will now be described.

At 15, on either side of the wheel 11, I provide securing nuts for the end of the axle 12 and which clamp to the stationary portion of such axle, the side frame members 3 and 4 at their ends 13 and 14 which are perforated and passed over the ends of the stationary axle.

At 17, I provide a supporting bracket perforated to admit the end of the axle, and having bent over ears or lugs 18 resting against the top and bottom edges of the side frame members. Two complementary brackets 17 are provided, one for each side of the vehicle and in like manner are clamped by the nuts 15 together with the side frame members to the stationary axle 12, the lugs 18 rigidly support the brackets 17 non-rotatably on the rear end of the frame side members and with the ends of the brackets 17 presented upwardly and rearwardly from the axle ends.

At 19 I show a substantially U-shaped lever element pivotally secured by bolts 20 to the ends of the brackets 17, the bolts 20 passing through a hinge perforation in the ends of the brackets and the U-shaped member, and the opening through the lever member ends being preferably larger somewhat than the diameter of the shanks of the bolts or rivets 20 passing through such perforations.

The lever member 19 passes around the vehicle wheel from one end of the axle, being looped over the periphery of the wheel tire 42 thereof and back to the other end of the wheel axle and is rotatable on the hinge comprising the bolts 20, so as to take the position as shown in Figs. 1 and 5, which is the normal inoperative position, or to take the position indicated by the dotted lines in Fig. 3 which is its braking position, such braking position being had when the operator depresses the lever 19 by pressing his foot against the top edge shown at 44 thereof. The lever member 19 is also adapted to be rotated about the hinge bolts 20 to a position just beyond a vertical position, as shown in Fig. 3, wherein the ends 22 of the intermediate portion thereof will rest upon the ground indicated by line 44 and support the tire 42 out of contact with the ground, the vehicle thereby resting upon the laterally disposed portions of the intermediate portion 22 of the lever and the front wheel 10.

The mid-portion of the lever 19 is bent concavely as shown at 23 so that when the intermediate portion 22 rests upon the ground, it will do so near its ends securing a substantially three-point contact between the ground and the vehicle. At such time the lever 19, although approximately vertical, is slightly inclined therefrom, the bottom portion comprising the intermediate arm 22 being disposed forwardly of a vertical line projected from the hinge bolts 20 so that the weight of the vehicle will cause the lever 19 at the point 24 to engage the sides of the bolts 15 which prevents further rotative movement of the end of the lever 19 forwardly, and forms a stop for the lever. The lever 19 is normally held in a position wherein it does not contact with the tire 42 and with its braking shoe portion 23 elevated above the braking position illustrated in Fig. 2, as is shown in Figs. 1 and 2, a spring 35 being secured to the frame at one end and adapted to be engaged by the lever 19 when the lever 19 is moved toward braking position, and exerts a retractile effort to restore the lever to normal position and to hold it in normal non-braking position during non-use of the braking mechanism.

When, however, it is desired to apply the brake, this is accomplished by the operator placing his foot, and usually the heel thereof, upon the upper surface of the pedal portion of the U-shaped lever 19 and depressing the same so that it takes the position indicated. This movement will continue until the rearward motion of the brake shoe 23 is arrested by coming into contact at 47 with the tire 42, the contact made being a braking contact and the degree of braking depending upon the pressure imparted to the U-shaped member 19 by the foot of the operator, and the amount of clutching effect exerted between the lever 19 and wheel tire 42.

It is found that this mechanism as described produces a very efficient braking action; it has the advantage of accomplishing a considerable braking pressure with a very moderate downward movement of the braking pedal, which in this case is the lever member 19. The braking movement of the lever 19 is arrested by its coming into contact with the side frame members 13 and the length of the side arms of the U-shaped lever 19, and the disposition of its pivot 20 relative to the radius of the wheel tire 42 is preferably such that there will be no undesirable, unduly severe clutching action between the braking portion 23 of the U-shaped lever and the tire of the wheel consequent upon the engagement of the braking portion with the tire and the rotation of the wheel before the movement of the lever is arrested by coming into contact with the frame. At the same time, the mechanism is capable of being embodied in structures having any desired degree of braking action, which may be greater than that which would ordinarily be secured by the manual braking effort alone, the energy stored in the moving vehicle being partially expended in advancing the brake lever to complete braking position after the movement is initiated by the foot of the rider. In such a case, there is a true "servo-brake" effect secured in the embodiment of my invention when so applied and adjusted.

While I have described a specific embodiment of my invention to convey a clear understanding of the invention, I am aware that numerous and extensive departures may be made from the embodiment herein illustrated and described, but without departing from the spirit of my invention.

What I claim is:

1. In a cycle, a pair of longitudinally aligned supporting wheels, a frame joining the wheels, a lever pivoted laterally of one of said wheels but eccentrically thereto, comprising a brake portion adapted to contact with the periphery of the wheel when rotated on its pivot, a stop secured to the frame adapted to limit rotation of the lever on its pivot to the opposite direction, said lever adapted to support the vehicle when rotated against said stop.

2. In a cycle, a pair of longitudinally aligned supporting wheels, a frame joining the wheels, a lever pivoted laterally of one of said wheels but eccentrically thereto, comprising a brake portion adapted to contact with the periphery of the wheel when rotated on its pivot, a stop secured to the frame adapted to limit rotation of the lever on its pivot to the opposite direction, said lever adapted to support the vehicle when rotated against said stop, and resilient means adapted normally to support the lever out of contact with the periphery of the wheel, said lever having a portion adapted to be engaged by the foot of the rider of the vehicle to move it to contact with the wheel periphery to brake the vehicle.

3. In a cycle, a pair of longitudinally aligned supporting wheels, a frame joining the wheels, a lever pivoted laterally of one of said wheels but eccentrically thereto, comprising a brake portion adapted to contact with the periphery of the wheel when rotated on its pivot, a stop secured to the frame adapted to limit rotation of the lever on its pivot to the opposite direction, said lever adapted to support the vehicle when rotated against said stop, said vehicle frame comprising a stop portion adapted to limit the movement of the lever in its rotation after contacting with the periphery of the wheel, to limit the clutching effect between wheel peripheral surface and the said lever portion.

4. In a cycle, a pair of longitudinally aligned supporting wheels, a frame joining the wheels, a lever pivoted to the frame laterally of one of said wheels but eccentrically thereto, comprising a brake portion adapted to contact with the periphery of the wheel when rotated on its pivot, said lever adapted to engage the frame when rotated in either direction on its pivot, said lever contacting with the periphery of the wheel to brake the same when moved in one direction to contact with the frame and adapted to support an end of the vehicle when rotated in the opposite direction to contact with the frame.

5. In a cycle, a pair of longitudinally aligned supporting wheels, a frame joining the wheels, a lever pivoted to the frame laterally of one of said wheels but eccentrically thereto, comprising a brake portion adapted to contact with the periphery of the wheel when rotated on its pivot, said lever adapted to engage the frame when rotated in either direction on its pivot, said lever contacting with the periphery of the wheel to brake the same when moved in one direction to contact with the frame and adapted to support an end of the vehicle when rotated in the opposite direction to contact with the frame, said lever having a pair of ground engaging portions at each side of the adjacent vehicle wheel.

6. In a cycle, a pair of longitudinally aligned supporting wheels, a frame joining the wheels, a lever pivoted to the frame laterally of one of said wheels but eccentrically thereto, comprising a portion adapted to contact with the periphery of the wheel when rotated on its pivot, said lever adapted to engage the frame when rotated in either direction on its pivot, said lever contacting with the periphery of the wheel to brake the same when moved in one direction to contact with the frame and adapted to support an end of the vehicle when rotated in the opposite direction to contact with the frame, said lever when supporting the vehicle being rotated to a position against the frame wherein its ground engaging portion is rotated beyond the vertical plane of the wheel axle.

7. In a cycle, a pair of longitudinally aligned supporting wheels, a frame joining the wheels, a lever pivoted to the frame laterally of one of said wheels but eccentrically thereto, comprising a portion adapted to contact with the periphery of the wheel when rotated on its pivot, said lever adapted to engage the frame when rotated in either direction on its pivot, said lever contacting with the periphery of the wheel to brake the same when moved in one direction to contact with the frame and adapted to support an end of the vehicle when rotated in the opposite direction to contact with the frame, said lever when supporting the vehicle being rotated to a position against the frame wherein its ground engaging portion is rotated beyond the vertical plane of the wheel axle, the brake contact and ground engaging portions of the vehicle when swung to braking and vehicle supporting positions, respectively, assuming positions disposed on the same side of the vertical axis of the wheel axle.

8. In a two-wheeled vehicle, a brake mechanism therefor comprising a brake lever pivoted to the vehicle frame and adapted for braking engagement with the tire of the vehicle at a point remote from its pivots, spring means to retract the said brake member from such braking engagement, and a pedal surface to be engaged by the foot of a rider to move said lever against the power of the spring to operate the brake, said lever being rotatable about its pivots from said normal and braking positions to carry its free end about the tire of the vehicle to a position of engagement with the ground or other surface upon which the vehicle rests, said ground engaging lever portions extending to either side of the vehicle to comprise with the vehicle front wheel, a substantially triangular support.

9. In a vehicle having a pair of longitudinally disposed supporting wheels the combination with a frame joining the wheels, of a brake lever pivoted to the frame eccentrically of one of the wheels and rotatable on its pivot about the wheel periphery and adapted to make braking engagement with the wheel periphery upon rotation of its free end to a side of the wheel disposed on an opposite side of the wheel axis to its pivot.

10. In a vehicle having a pair of longitudinally disposed supporting wheels, a combined brake and stand comprising a lever adapted to be swung from a vehicle supporting position to a position of braking engagement with one of said wheels, said lever being pivoted to the frame eccentrically of the wheel axis.

11. In a vehicle having a pair of longitudinally disposed supporting wheels, a combined brake and stand comprising a lever adapted to be swung from a vehicle supporting position to a position of braking engagement with one of said wheels, said lever being pivoted to the frame eccentrically of the wheel axis, and adapted to contact with the frame at an intermediate portion of the lever to prevent rotation of the lever beyond vehicle supporting position.

12. In a vehicle having a pair of longitudinally disposed supporting wheels, a combined brake and stand comprising a lever adapted to be swung from a vehicle supporting position to a position of braking engagement with the periphery of one of said wheels, said lever being pivoted to the frame eccentrically of the wheel axis, and adapted to contact with the frame at an intermediate portion of the lever to prevent rotation of the lever beyond vehicle supporting position, said lever adapted in vehicle supporting position to make engagement with the ground at a point laterally of said wheel and intermediate the wheels.

13. In a vehicle having a pair of longitudinally disposed supporting wheels, a combined brake and stand comprising a lever adapted to be swung from a vehicle supporting position to a position of braking engagement with the periphery of one of said wheels, said lever being pivoted to the frame eccentrically of the wheel axis, and adapted to contact with the frame at an intermediate portion of the lever to prevent rotation of the lever beyond vehicle supporting position, said lever making engagement with the periphery of the wheel intermediate the axes of the wheels.

In testimony whereof I hereunto affix my signature this 4th day of February, 1926.

MAYO E. ROE.